US012639006B2

(12) United States Patent
Zhu et al.

(10) Patent No.: US 12,639,006 B2
(45) Date of Patent: May 26, 2026

(54) STORAGE APPARATUS AND DATA PROCESSING METHOD

(71) Applicant: HUAWEI TECHNOLOGIES CO., LTD., Shenzhen (CN)

(72) Inventors: Xiaoming Zhu, Shanghai (CN); Yifeng Chen, Shanghai (CN); Yu Liao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/480,355

(22) Filed: Oct. 3, 2023

(65) Prior Publication Data

US 2024/0028263 A1 Jan. 25, 2024

Related U.S. Application Data

(63) Continuation of application No. PCT/CN2022/084338, filed on Mar. 31, 2022.

(30) Foreign Application Priority Data

Apr. 7, 2021 (CN) .......................... 202110373612.5
Apr. 30, 2021 (CN) .......................... 202110485385.5

(51) Int. Cl.
*G06F 3/06* (2006.01)

(52) U.S. Cl.
CPC .......... *G06F 3/0659* (2013.01); *G06F 3/0604* (2013.01); *G06F 3/0613* (2013.01); *G06F 3/0683* (2013.01)

(58) Field of Classification Search
None
See application file for complete search history.

(56) References Cited

U.S. PATENT DOCUMENTS

2006/0018145 A1* 1/2006 Kim .......................... G11C 7/20
365/145
2007/0055813 A1* 3/2007 Ingram ............... G06F 13/1642
711/100

(Continued)

FOREIGN PATENT DOCUMENTS

CN 103680577 A 3/2014

OTHER PUBLICATIONS

Bechtolsheim et al: "Sun's Sparcstation 1: A Workstation for the 1990S," Compcon Spring 90: Thirty-Fifth IEEE Computer Society International Conference Intellectual Leverage, San Francisco, CA, USA, Total 6 pages, Institute of Electrical Electronics Engineers, New York, New York, XP000146182 (Feb. 26, 1990).

(Continued)

*Primary Examiner* — Stephanie Wu
(74) *Attorney, Agent, or Firm* — Leydig, Voit & Mayer, Ltd.

(57) ABSTRACT

A storage apparatus includes a controller and a storage medium. The storage medium includes a command decoder and a plurality of storage units. The controller is connected to the command decoder of the storage medium. The controller is configured to send a first processing command to the command decoder of the storage medium, where the first processing command includes first information and second information, the first information indicates a processing manner, and the second information indicates a data length of data to be processed.

19 Claims, 5 Drawing Sheets

(56)  References Cited

U.S. PATENT DOCUMENTS

| | | | |
|---|---|---|---|
| 2009/0172499 A1* | 7/2009 | Olbrich ................. | G06F 3/0604 |
| | | | 714/773 |
| 2009/0196102 A1* | 8/2009 | Kim ..................... | G11C 7/1045 |
| | | | 365/185.11 |
| 2012/0266002 A1* | 10/2012 | Kim ......................... | G11C 8/10 |
| | | | 713/320 |
| 2015/0106560 A1* | 4/2015 | Perego ................ | G06F 12/0638 |
| | | | 711/105 |
| 2016/0154753 A1* | 6/2016 | Gittins ................ | G06F 12/0811 |
| | | | 710/117 |
| 2019/0354485 A1 | 11/2019 | Murphy | |

OTHER PUBLICATIONS

Remaklus W: "On-chip bus structure for custom core logic designs," Wescon Conference, IEEE Center, Hoes Lane, US, Total 8 pages, XP002167169, Institute of Electrical Electronics Engineers, New York, New York, (Sep. 15, 1998).

* cited by examiner

STORAGE APPARATUS AND DATA PROCESSING METHOD

CROSS-REFERENCE TO RELATED APPLICATIONS

This application is a continuation of International Application No. PCT/CN2022/084338, filed on Mar. 31, 2022, which claims priority to Chinese Patent Application No. 202110373612.5, filed on Apr. 7, 2021 and Chinese Patent Application No. 202110485385.5, filed on Apr. 30, 2021. All of the aforementioned patent applications are hereby incorporated by reference in their entireties.

TECHNICAL FIELD

This application relates to the field of computer technologies, and in particular, to a storage apparatus and a data processing method.

BACKGROUND

A computer device includes a plurality of components, and a storage medium is one of the plurality of components. In the storage medium, data is stored in a form of a plurality of storage units, and the storage unit is a minimum operation unit for data processing.

In a related technology, a controller in the computer device sends a command to the storage medium, where each command is specific to one storage unit in the storage medium. Therefore, when data processing needs to be performed based on a plurality of storage units, the controller needs to send a plurality of processing commands to the storage medium. In this manner, the controller needs to consume a large quantity of processing resources, resulting in a resource waste and low data processing efficiency.

SUMMARY

Embodiments of this application provide a storage apparatus and a data processing method in a related technology field. Embodiments are as follows:

According to a first aspect, a storage apparatus is provided. The storage apparatus includes a controller and a storage medium. The storage medium includes a command decoder and a plurality of storage units. The controller is connected to the command decoder of the storage medium. The controller is configured to send a first processing command to the command decoder of the storage medium, where the first processing command includes first information and second information, the first information indicates a processing manner, and the second information indicates a data length of data to be processed. Correspondingly, the command decoder of the storage medium is configured to: receive the first processing command sent by the controller; determine at least two target storage units from the plurality of storage units of the storage medium based on the data length indicated by the second information in the first processing command; and then perform, based on the at least two target storage units, data processing in the processing manner indicated by the first information in the first processing command.

It can be learned that the controller only needs to send one processing command, so that the command decoder of the storage medium can perform continuous data processing based on at least two storage units. Compared with a case in which each processing command can only indicate the command decoder to perform data processing based on one storage unit, the storage apparatus provided in this embodiment can reduce a quantity of processing commands that need to be sent by the controller. Therefore, processing resources that need to be consumed by the controller in a data processing process are reduced, a resource waste is avoided, and data processing efficiency is improved.

In a possible implementation, the plurality of storage units of the storage medium are located in at least one storage row. The command decoder of the storage medium is configured to determine a start address of the data to be processed, and determine the at least two target storage units from the plurality of storage units of the storage medium based on the second information, lengths of the plurality of storage units, a length of the at least one storage row, and the start address of the data to be processed. An example implementation of determining the at least two target storage units is provided, so that the command decoder of the storage medium can implement data processing based on the at least two determined target storage units.

In a possible implementation, the first processing command further includes third information, and the third information indicates an address. The command decoder of the storage medium is configured to determine the address indicated by the third information as the start address of the data to be processed, where addresses of the at least two target storage units are consecutive. When the first processing command carries the third information, the command decoder of the storage medium directly uses the address indicated by the third information as the start address of the data to be processed. Therefore, in a subsequent process, a storage unit in which the start address of the data to be processed is located may be used as a first target storage unit, and consecutive storage units including the first target storage unit may be determined as the at least two target storage units.

In a possible implementation, the command decoder of the storage medium is configured to determine, based on the plurality of storage units of the storage medium, the start address of the data to be processed, where addresses of the at least two target storage units are consecutive or inconsecutive. Correspondingly, the command decoder of the storage medium is further configured to encapsulate a command identifier of the first processing command and the addresses of the at least two target storage units to obtain a response message, and send the response message to the controller. The controller is further configured to receive the response message. In this implementation, the command decoder of the storage medium randomly determines, from the plurality of storage units, the start address of the data to be processed, and randomly determines the at least two target storage units. In this case, the at least two target storage units may be consecutive or may be inconsecutive. Because the at least two target storage units are randomly determined, the command decoder further needs to return the addresses of the at least two target storage units to the controller, so that the controller determines target storage units based on which the command decoder implements data processing.

In a possible implementation, the processing manner indicated by the first information includes a first processing manner, and the first processing manner includes a processing manner of storing data in a storage unit. The controller is further configured to send the data. Correspondingly, the command decoder of the storage medium is configured to store, in the at least two target storage units in the first processing manner, the data sent by the controller. The first processing manner is, for example, writing or overwriting. A data processing process performed by the command decoder is a data storage process.

In a possible implementation, the processing manner indicated by the first information includes a second processing manner, and the second processing manner includes a manner of performing data processing based on a storage unit in which data is already stored. The command decoder of the storage medium is configured to process, in the second processing manner, data already stored in the at least two target storage units. The second processing manner is, for example, reading or erasing. A data processing process performed by the command decoder is a processing process of the data that is already stored.

In a possible implementation, the command decoder of the storage medium is further configured to send, based on an address sequence of the at least two target storage units, the data already stored in the at least two target storage units to the controller. The controller is further configured to receive the data that is already stored in the at least two target storage units and that is sent by the command decoder of the storage medium. For example, when the processing manner is reading, the command decoder of the storage medium needs to return read data to the controller. The command decoder completes data sending through a plurality of sending processes, and a length of data sent in each sending process depends on a bit width of a sending interface.

In a possible implementation, the first processing command further includes fourth information, the fourth information indicates a data grouping requirement, and the data grouping requirement includes grouping the at least two target storage units in a unit of a storage row, or grouping the at least two target storage units in a unit of a storage column. The command decoder of the storage medium is configured to group the at least two target storage units based on the data grouping requirement indicated by the fourth information, to obtain at least one group, and perform, based on a target storage unit in each group, data processing in the processing manner indicated by the first information. In this implementation, based on the indication of the fourth information, the command decoder of the storage medium may perform data processing in the unit of the storage row, that is, after completing data processing on each target storage unit in one storage row, switch to another storage row to perform data processing on a target storage unit in the another storage row. Alternatively, the command decoder of the storage medium may perform data processing in the unit of the storage column, that is, after completing data processing on each target storage unit in one storage column, switch to another storage column. Based on the fourth information, a data processing process of the command decoder becomes flexible.

In a possible implementation, the command decoder of the storage medium is configured to: for any group, enable target storage units in the group in parallel; and perform, in the processing manner indicated by the first information, data processing on the target storage units enabled in parallel in the group, to cause a difference between processing time of the target storage units enabled in parallel in the group to be less than a threshold. Target storage units in a same group are enabled in parallel and data processing is performed, so that time required for enabling and data processing is reduced, and total time required for data processing is shortened.

In a possible implementation, the at least two target storage units are located in a same logical unit number, and the target storage unit is a minimum unit for data processing. In this embodiment, one storage medium is one logical unit number. Therefore, the at least two target storage units determined from the plurality of storage units of the storage medium are located in the same logical unit number.

In a possible implementation, the command decoder of the storage medium is further configured to parse the first processing command to obtain the first information and the second information. The command decoder obtains the first information and the second information by parsing the first processing command.

In a possible implementation, a sum of lengths of the at least two target storage units is not less than the data length indicated by the second information. Because the target storage unit is the minimum unit for data processing, the sum of the lengths of the at least two target storage units may be equal to the data length indicated by the second information, or may be greater than the data length indicated by the second information. For example, when the data length cannot be exactly divided by the length of the storage unit, the sum of the lengths of the at least two target storage units is greater than the data length indicated by the second information.

In a possible implementation, there are a plurality of storage media, and the controller is configured to receive a storage medium identifier, and send the first processing command to a command decoder of a storage medium indicated by the storage medium identifier. When there are a plurality of storage media, the controller determines, based on the storage medium identifier, a command decoder of a storage medium to which the first processing command is sent. For example, if the storage medium identifier is a logical address sent by a processor, the controller uses a command decoder indicated by a physical address corresponding to the logical address as a command decoder configured to receive the first processing command.

According to a second aspect, a data processing method is provided. The method is applied to a storage apparatus. The storage apparatus includes a controller and a storage medium. The storage medium includes a command decoder and a plurality of storage units. The method includes:

The command decoder of the storage medium receives a first processing command sent by the controller, where the first processing command includes first information and second information, the first information indicates a processing manner, and the second information indicates a data length of data to be processed.

The command decoder of the storage medium determines at least two target storage units from the plurality of storage units of the storage medium based on the data length indicated by the second information.

The command decoder of the storage medium performs, based on the at least two target storage units, data processing in the processing manner indicated by the first information.

In a possible implementation, the plurality of storage units of the storage medium are located in at least one storage row. That the command decoder of the storage medium determines at least two target storage units from the plurality of storage units of the storage medium based on the data length indicated by the second information includes: The command decoder of the storage medium determines a start address of the data to be processed; and the command decoder of the storage medium determines the at least two target storage units from the plurality of storage units of the storage medium based on the second information, lengths of the plurality of storage units, a length of the at least one storage row, and the start address of the data to be processed.

In a possible implementation, the first processing command further includes third information, and the third information indicates an address. That the command decoder of the storage medium determines a start address of the data to be processed includes: The command decoder of the storage medium determines the address indicated by the third information as the start address of the data to be processed, where addresses of the at least two target storage units are consecutive.

In a possible implementation, that the command decoder of the storage medium determines a start address of the data to be processed includes: determining, based on the plurality of storage units of the storage medium, the start address of the data to be processed, where addresses of the at least two target storage units are consecutive or inconsecutive. After that the command decoder of the storage medium performs, based on the at least two target storage units, data processing in the processing manner indicated by the first information, the method further includes: The command decoder of the storage medium encapsulates a command identifier of the first processing command and the addresses of the at least two target storage units to obtain a response message, and sends the response message to the controller.

In a possible implementation, the processing manner indicated by the first information includes a first processing manner, and the first processing manner includes a processing manner of storing data in a storage unit. That the command decoder of the storage medium performs, based on the at least two target storage units, data processing in the processing manner indicated by the first information includes: The command decoder of the storage medium stores, in the at least two target storage units in the manner indicated by the first information, data sent by the controller.

In a possible implementation, the processing manner indicated by the first information includes a second processing manner, and the second processing manner includes a manner of performing data processing based on a storage unit in which data is already stored. That the command decoder of the storage medium performs, based on the at least two target storage units, data processing in the processing manner indicated by the first information includes: The command decoder of the storage medium processes, in the second processing manner, data already stored in the at least two target storage units.

In a possible implementation, after that the command decoder of the storage medium performs, based on the at least two target storage units, data processing in the processing manner indicated by the first information, the method further includes: The command decoder of the storage medium sends, based on an address sequence of the at least two target storage units, the data already stored in the at least two target storage units to the controller.

In a possible implementation, the first processing command further includes fourth information, the fourth information indicates a data grouping requirement, and the data grouping requirement includes grouping the at least two target storage units in a unit of a storage row, or grouping the at least two target storage units in a unit of a storage column. That the command decoder of the storage medium performs, based on the at least two target storage units, data processing in the processing manner indicated by the first information includes: The command decoder of the storage medium groups the at least two target storage units based on the data grouping requirement indicated by the fourth information, to obtain at least one group; and the command decoder of the storage medium performs, based on a target storage unit in each group, data processing in the processing manner indicated by the first information.

In a possible implementation, that the command decoder of the storage medium performs, based on a target storage unit in each group, data processing in the processing manner indicated by the first information includes: For any group, the command decoder of the storage medium enables target storage units in the group in parallel; and the command decoder of the storage medium performs, in the processing manner indicated by the first information, data processing on the target storage units enabled in parallel in the group, to cause a difference between processing time of the target storage units enabled in parallel in the group to be less than a threshold.

In a possible implementation, the at least two target storage units are located in a same logical unit number, and the target storage unit is a minimum unit for data processing.

In a possible implementation, before that the command decoder of the storage medium performs, based on a target storage unit in each group, data processing in the processing manner indicated by the first information, the method further includes: The command decoder of the storage medium parses the first processing command to obtain the first information and the second information.

In a possible implementation, a sum of lengths of the at least two target storage units is not less than the data length indicated by the second information.

According to a third aspect, a data processing method is provided. The method is applied to a storage apparatus. The storage apparatus includes a controller and a storage medium. The storage medium includes a command decoder and a plurality of storage units. The method includes:

The controller determines first information and second information, where the first information indicates a processing manner, the second information indicates a data length of data to be processed, the data length is used to determine at least two target storage units from the plurality of storage units of the storage medium, and the at least two target storage units are used for data processing.

The controller encapsulates the first information and the second information to obtain a first processing command.

The controller sends the first processing command to the command decoder of the storage medium.

In a possible implementation, that the controller determines first information and second information includes: receiving a second processing command, where the second processing command includes first reference information and second reference information, the first reference information indicates a processing manner, and the second reference information indicates a data length of data to be processed; and determining the first reference information as the first information, and determining the second information based on the second reference information.

In a possible implementation, that the controller determines first information and second information includes: If there are at least two second processing commands, the determining the second information based on the second reference information includes: In response to a fact that a data length indicated by second reference information of each of the at least two second processing commands is less than a lower limit of a reference range, the controller combines the second reference information of the at least two second processing commands to obtain the second information, where the data length indicated by the second information is within the reference range.

In a possible implementation, that the controller determines first information and second information includes: In response to a fact that the data length indicated by the second reference information of the second processing command is greater than an upper limit of a reference range, the controller divides the second reference information to obtain at least two pieces of second information, where a data length indicated by any second information is within the reference range.

In a possible implementation, that the controller determines first information and second information includes: in response to a fact that the data length indicated by the second reference information of the second processing command is within a reference range, using the second reference information as the second information.

In a possible implementation, before that the controller sends the first processing command to the command decoder of the storage medium, the method further includes: The controller obtains third information, where the third information indicates an address; and encapsulates the third information into the first processing command.

In a possible implementation, after that the controller sends the first processing command to the command decoder of the storage medium, the method further includes: receiving a response message sent by the command decoder of the storage medium, where the response message includes a command identifier of the first processing command and addresses of the at least two target storage units.

In a possible implementation, after that the controller sends the first processing command to the command decoder of the storage medium, the method further includes: sending data, where the data is stored by the command decoder of the storage medium in the at least two target storage units.

In a possible implementation, after that the controller sends the first processing command to the command decoder of the storage medium, the method further includes: receiving the data that is stored in the at least two target storage units and that is sent by the command decoder of the storage medium based on an address sequence of the at least two target storage units.

In a possible implementation, before that the controller sends the first processing command to the command decoder of the storage medium, the method further includes: The controller determines fourth information, where the fourth information indicates a data grouping requirement, and the data grouping requirement includes grouping the at least two target storage units in a unit of a storage row, or grouping the at least two target storage units in a unit of a storage column; and encapsulates the fourth information into the first processing command.

In a possible implementation, the at least two target storage units are located in a same logical unit number, and the target storage unit is a minimum unit for data processing.

In a possible implementation, a sum of lengths of the at least two target storage units is not less than the data length indicated by the second information.

In a possible implementation, there are a plurality of storage apparatuses, and that the controller sends the first processing command to the command decoder of the storage medium includes: The controller receives a storage medium identifier, and sends the first processing command to a command decoder of a storage medium indicated by the storage medium identifier.

DESCRIPTION OF EMBODIMENTS

Terms used in descriptions of embodiments of this application are only used to explain exemplary embodiments of this application, but are not intended to limit this application.

Figure 1:
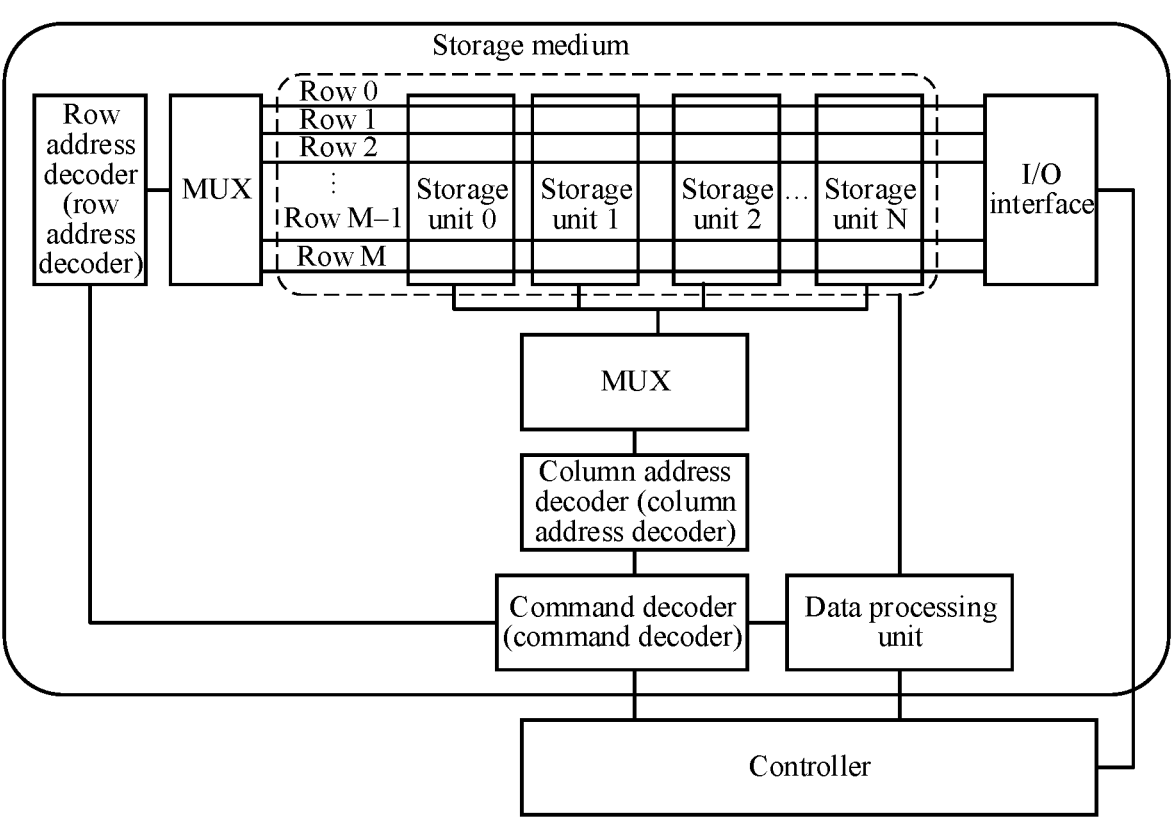
FIG. 1 is a schematic diagram of a structure of a storage apparatus according to an embodiment of this application.

An embodiment of this application provides a storage apparatus. Refer to FIG. 1. The storage apparatus includes a controller and a storage medium. The storage medium includes a command decoder and a plurality of storage units. The controller is connected to the command decoder of the storage medium. Therefore, the command decoder of the storage medium can receive a processing command sent by the controller, and perform data processing based on the received processing command. One storage medium is one logical unit number (LUN), and the LUN is also referred to as a die. In the storage medium, the plurality of storage units form an array, and the array is also referred to as a bank. The array includes M rows and N columns, where M and N are integers not less than 1. One storage unit is uniquely identified by one row and one column. In addition, the storage medium further includes an input/output (I/O) interface. The I/O interface is connected to the controller, to return a data processing result to the controller as required.

Figure 2:
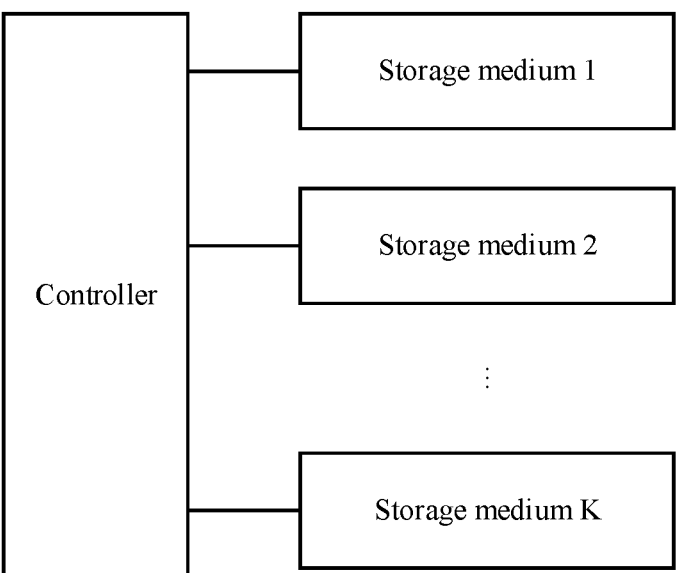
FIG. 2 is a schematic diagram of a structure of a storage apparatus according to an embodiment of this application.

For example, refer to FIG. 2. The storage apparatus includes a plurality of storage media. Each of the plurality of storage media includes the foregoing command decoder and the plurality of storage units, and details are not described herein again. For a controller in the storage apparatus, the controller is separately connected to command decoder of the plurality of storage media.

For example, refer to FIG. 1. In addition to the foregoing controller and the plurality of storage units, any storage medium further includes a row address decoder and a column address decoder. The row address decoder and the column address decoder each further correspond to a multiplexer (MUX). The command decoder sends a command to the row address decoder, and the row address decoder controls, based on the command, the MUX corresponding to the row address decoder to enable one or more rows in an array. The command decoder further sends a command to the column address decoder, and the column address decoder controls, based on the command, the MUX corresponding to the column address decoder to enable one or more columns in the array. Because a storage unit is uniquely identified by a row and a column, one or more storage units in the array can be enabled after the row and the column in the array are separately enabled. In this embodiment, the enabled storage unit may be configured to perform data processing.

Refer to FIG. 1. Any storage medium further includes a data processing unit. The data processing unit is connected to the command decoder, and cooperates with the command decoder to complete a data processing process under control of the command decoder. The command decoder first enables the storage unit in the array by controlling the row address decoder and the column address decoder, and then controls the data processing unit to perform data processing based on the enabled storage unit. For example, the data processing unit performs processing such as reading and erasing on the enabled storage unit under the control of the command decoder. For another example, the data processing unit is further connected to the controller, to receive data sent by the controller, and write the received data into the enabled storage unit under the control of the command decoder.

Figure 3:
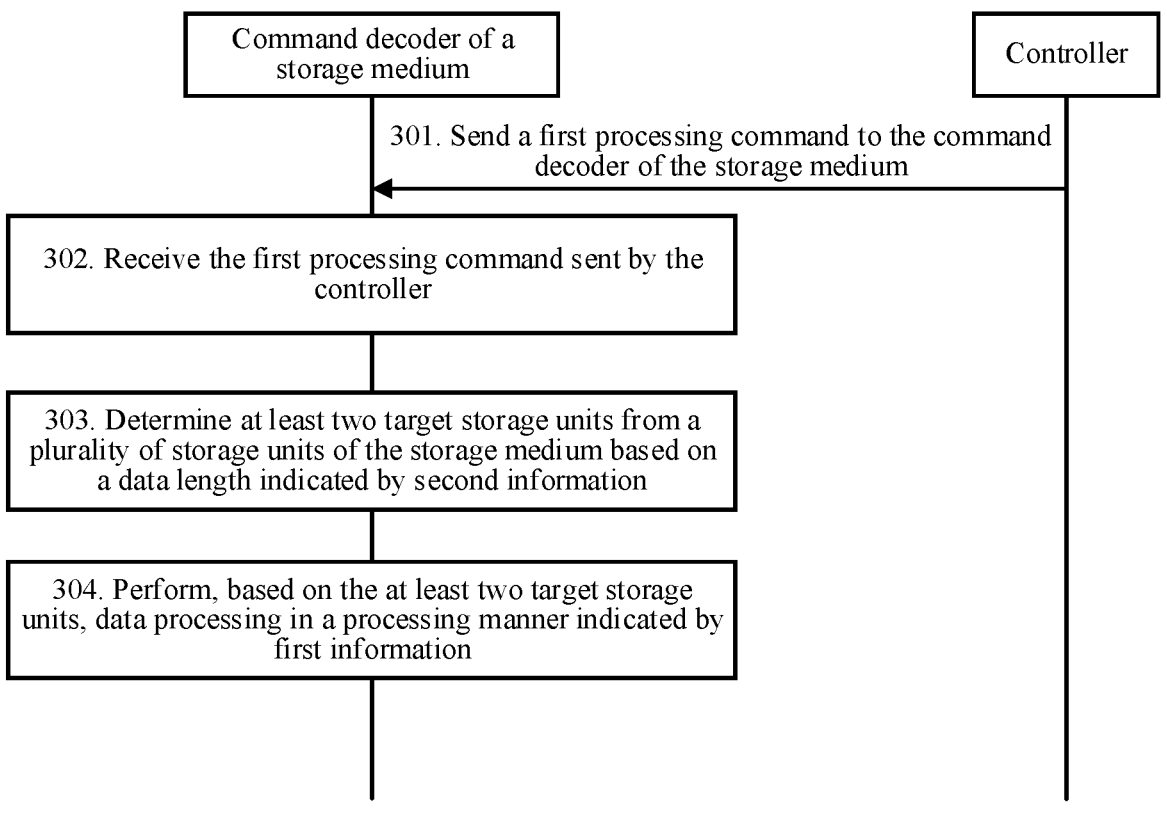
FIG. 3 is a flowchart of a data processing method according to an embodiment of this application.

Based on the storage apparatuses shown in FIG. 1 and FIG. 2, an embodiment of this application provides a data processing method. The method is applied to an interaction process between a controller and a command decoder of a storage medium. Refer to FIG. 3. The method includes the following content.

301. The controller sends a first processing command to the command decoder of the storage medium.

The first processing command includes first information and second information, the first information indicates a processing manner, and the second information indicates a data length of data to be processed. The processing manner indicated by the first information includes but is not limited to: reading, writing, erasing, and overwriting, and the like. Reading refers to obtaining data that is already stored in a storage unit and returning the data to the controller; writing refers to storing data in a storage unit in which no data is stored; erasing refers to deleting data that is already stored in a storage unit; and overwriting refers to storing data in a storage unit in which data is already stored. Certainly, the foregoing manners are all examples, and are not intended to limit the processing manner indicated by the first information. The data length of the data to be processed that is indicated by the second information is determined according to an actual requirement. In this embodiment, the second information can indicate the data length in a plurality of manners. For example, the second information includes a length value, and the data length is equal to the length value. For another example, the second information includes a quantity of storage units, and the data length is equal to a product of the quantity of the storage unit and a length of the storage unit. For still another example, the second information includes a first address and a second address after the first address, and the data length is equal to a difference between the second address and the first address.

For the controller, the controller first determines the first information and the second information, and then encapsulates the first information and the second information to obtain the foregoing first processing command, to send the first processing command to the command decoder of the storage medium. For example, that the controller determines the first information and the second information includes: receiving a second processing command, where the second processing command includes first reference information and second reference information, the first reference information indicates a processing manner, and the second reference information indicates a data length of data to be processed; and determining the first reference information as the first information, and determining the second information based on the second reference information.

The second processing command includes a command sent by a processor to the controller. The processor is another component located outside a storage apparatus. The processor and the storage apparatus may be integrated into a same computer device, or may be separately located in different computer devices. The processing manner indicated by the first reference information includes but is not limited to reading, writing, erasing, overwriting, and the like. In this embodiment, the first reference information is used as the first information, so that processing manners indicated by the first processing command and the second processing command are the same. For example, the determining the second information based on the second reference information includes the following three cases A1 to A3.

Case A1: If there are at least two second processing commands, the determining the second information based on the second reference information includes: In response to a fact that a data length indicated by second reference information of each of the at least two second processing commands is less than a lower limit of a reference range, the controller combines the second reference information of the at least two second processing commands to obtain the second information, where the data length indicated by the second information is within the reference range.

The reference range is a value range of the data length, and the lower limit and an upper limit of the reference range are not limited in this embodiment. That the data length indicated by the second information is within the reference range means that the data length indicated by the second information is not less than the lower limit of the reference range, and is not greater than the upper limit of the reference range. For example, the lower limit and the upper limit of the reference range are determined based on processing efficiency when the storage medium performs data processing. For example, processing efficiency when the storage medium processes data of different data lengths is obtained, and the lower limit and the upper limit of the reference range are determined based on a data length corresponding to processing efficiency higher than an efficiency threshold. Therefore, when the storage medium processes data within the reference range, the storage medium can have high processing efficiency.

An example in which the lower limit of the reference range is 128 B and the upper limit of the reference range is 1 MB is used to describe a process in which the controller combines the second reference information.

In two second processing commands received by the controller, both processing manners indicated by first reference information are writing, a data length indicated by one piece of second reference information is 64 B, and a data length indicated by the other piece of second reference information is 96 B. In this case, a data length indicated by each of the two pieces of second reference information is less than the lower limit of the reference range, that is, 128 B. Therefore, the controller combines the data lengths indicated by the two pieces of second reference information, that is, uses a sum of 64 B and 96 B, namely, 160 B, as the second information, and the data length 160 B indicated by the second information is within the reference range of 128 B to 1 MB. The controller subsequently only needs to send one first processing command to the command decoder of the storage medium. A processing manner indicated by the first information of the first processing command is writing, and a data length indicated by second information of the first processing command is 160 B.

When the controller does not combine the second reference information of the at least two second processing commands, for each second processing command, the controller needs to send one first processing command to the command decoder of the storage medium, that is, the controller needs to send at least two first processing commands to the command decoder of the storage medium. In the case A1, because the controller combines the second reference information of the at least two second processing commands, a quantity of first processing command sent by the controller to the command decoder of the storage medium is reduced. In this way, processing resources that need to be consumed by the controller in a data processing process are reduced, and data processing efficiency is improved.

For example, in this embodiment, when processing manners indicated by first reference information of the at least two second processing commands are the same, the second reference information of the at least two second processing commands is combined. For example, if both the processing manners indicated by the first reference information of the two second processing commands are writing, the second reference information of the two second processing commands is combined. However, if a processing manner indicated by first reference information of one second processing command is writing, and a processing manner indicated by first reference information of the other second processing command is reading, the two second processing commands are not combined.

Case A2: In response to a fact that the data length indicated by the second reference information of the second processing command is greater than an upper limit of a reference range, the controller divides the second reference information to obtain at least two pieces of second information, where a data length indicated by any second information is within the reference range.

For a manner of determining the upper limit of the reference range, refer to the descriptions in the case A1, and details are not described herein again. In a process in which the controller divides the second reference information to obtain the second information, data lengths indicated by different second information may be the same or may be different, provided that the data length indicated by each piece of second information is within the reference range.

An example in which a lower limit of the reference range is 128 B and the upper limit of the reference range is 1 MB is used to describe a process in which the controller divides the second reference information.

The controller receives the second processing command, where the processing manner indicated by the first reference information of the second processing command is reading, and the data length indicated by the second reference information of the second processing command is 4 MB, which is greater than the upper limit of the reference range, namely, 1 MB. Therefore, the controller divides the second reference information into a plurality of pieces of second information, for example, evenly divides the second reference information into four pieces, to obtain four pieces of second information. Each piece of second information indicates a data length of 1 MB, which is within the reference range of 128 B to 1 MB. The controller subsequently sends four first processing commands to the command decoder of the storage medium. A processing manner indicated by first information of each first processing command is reading, and a data length indicated by second information is 1 MB.

When the controller does not divide the second reference information of the second processing command, the controller sends only one first processing command to the command decoder of the storage medium. Based on the first processing command, the storage medium needs to process long data (for example, 4 MB in the foregoing example) in one data processing process. Therefore, it needs to take long time for the storage medium to complete one time of data processing. In some scenarios, after completing one time of data processing, the storage medium needs to return information to the controller. Because it needs to take long time for the storage medium to complete one time of data processing, the controller needs to wait for long time to receive the information returned by the storage medium. For example, in a data reading scenario, after completing data reading based on the first processing command, the storage medium needs to return read data to the controller. The controller needs to wait for long time to receive the data read by the storage medium.

However, in the case A2, because the controller divides the second reference information of the second processing command, at least two first processing commands are obtained. Based on each first processing command, a length of data to be processed by the storage medium in one data processing process is reduced (where for example, in the foregoing example, the length is reduced from 4 MB to 1 MB), so that time required by the storage medium to complete one time of data processing is shortened. In a scenario in which the storage medium needs to return information to the controller, the controller only needs to wait for short time to receive the information returned by the storage medium.

Case A3: In response to a fact that the data length indicated by the second reference information of the second processing command is within a reference range, the second reference information is used as the second information.

When the data length indicated by the second reference information of the second processing command is within the reference range, the second reference information may be directly used as the second information. In the case A3, the second processing command sent by the processor to the controller is the first processing command sent by the controller to the command decoder of the storage medium, that is, the second processing command is the same as the first processing command.

The foregoing describes a manner in which the controller generates the first processing command. When the controller is connected to a command decoder of one storage medium, the controller only needs to send the first processing command to the command decoder of the storage medium. It should be noted that, the storage medium corresponds to a chip enable (CE) pin. The controller enables the storage medium by using the CE pin, to obtain the enabled storage medium, and sends the first processing command to the enabled storage medium.

When the controller is connected to command decoders of a plurality of storage media, the controller further needs to determine a command decoder of a storage medium to which the first processing command is sent. For example, the controller receives a storage medium identifier, and sends the first processing command to a command decoder of a storage medium indicated by the storage medium identifier. The storage medium identifier is carried in the second processing command sent by the processor to the controller, and the storage medium identifier is, for example, a logical address. The controller stores a mapping relationship between a logical address and a physical address. The controller can determine, based on the mapping relationship, a physical address corresponding to the logical address, and determine, in the plurality of storage media, a storage medium indicated by the physical address corresponding to the logical address as a target storage medium. A command decoder of the target storage medium is configured to receive the first processing command. Therefore, the controller enables the target storage medium by using a CE pin of the target storage medium, and sends the first processing command to the enabled target storage medium.

302. The command decoder of the storage medium receives the first processing command sent by the controller.

Because the command decoder of the storage medium is connected to the controller, after the controller sends the first processing command, the command decoder of the storage medium correspondingly receives the first processing command.

303. The command decoder of the storage medium determines at least two target storage units from the plurality of storage units of the storage medium based on the data length indicated by the second information.

It can be learned from the descriptions in 301 that the first processing command includes the first information and the second information. To obtain the first information and the second information in the first processing command, for example, the method further includes: The command decoder of the storage medium parses the first processing command to obtain the first information and the second information. After obtaining the first information and the second information, the command decoder of the storage medium can determine the data length indicated by the second information, to determine the at least two target storage units from the plurality of storage units of the storage medium based on the data length.

It should be noted that, because one storage medium is one LUN, the at least two target storage units determined from the plurality of storage units of the storage medium are also located in a same LUN. In addition, the target storage unit is a minimum unit for data processing. In other words, in the data processing process, data is processed based on an integer quantity of target storage units. For any target storage unit, data processing is not performed based on only a part of the target storage unit. Therefore, a sum of lengths of the at least two target storage units is not less than the data length. For example, when the data length can be exactly divided by the length of the target storage unit, the sum of the lengths of the at least two target storage units is equal to the data length. For another example, when the data length cannot be exactly divided by the length of the target storage unit, the sum of the lengths of the at least two target storage units is greater than the data length.

In an example embodiment, that the command decoder of the storage medium determines at least two target storage units from the plurality of storage units of the storage medium based on the data length indicated by the second information includes the following 3031 and 3032.

3031. The command decoder of the storage medium determines a start address of the data to be processed.

Figure 4:
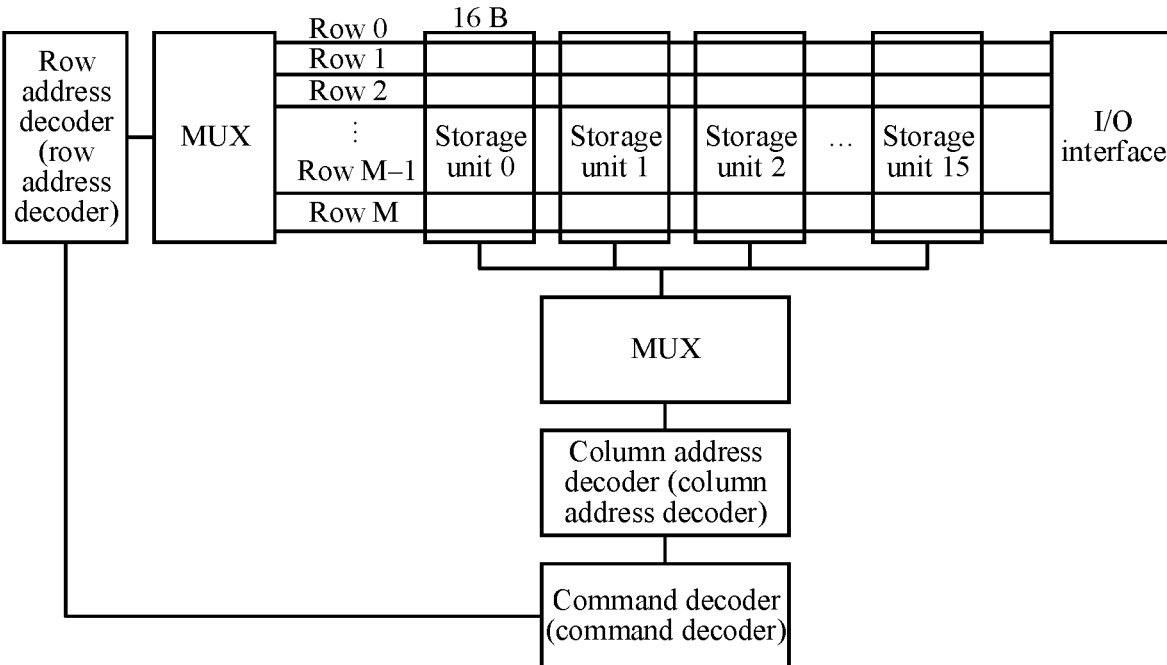
FIG. 4 is a schematic diagram of a structure of a storage apparatus according to an embodiment of this application.

The start address of the data to be processed affects a quantity of target storage units. In the case of a same data length indicated by second information and a same length of each storage unit, a quantity of target storage units may vary with a start address of data to be processed. For example, the data length indicated by the second information is 32 B and the length of the storage unit is 16 B. Refer to FIG. 4. In response to a fact that the start address of the data to be processed is a first address bit of a storage unit 0 in a row 0, the target storage units are the storage unit 0 and a storage unit 1 in the row 0, and the quantity of target storage units is 2. In response to a fact that the start address of the data to be processed is between a first address bit and a last address bit of a storage unit 0 in a row 0, the target storage units are the storage unit 0, a storage unit 1, and a storage unit 3 in the row 0, and the quantity of target storage units is 3. It can be learned that, in this embodiment, the start address of the data to be processed needs to be determined, to subsequently determine the quantity of target storage units. For example, a manner of determining the start address of the data to be processed includes the following two cases.

Case B1: The first processing command further includes third information, the third information indicates an address, and the command decoder of the storage medium determines the address indicated by the third information as the start address of the data to be processed. It can be learned from the foregoing descriptions that the first processing command is obtained by encapsulating the first information and the second information by the controller. When the first processing command further includes the third information, before the controller sends the first processing command obtained by encapsulation, the method further includes: The controller obtains the third information indicating the address, and encapsulates the third information into the first processing command. For example, the second processing command sent by the processor to the controller includes information indicating the address. The controller parses the second processing command to obtain the information indicating the address, and uses the information indicating the address as the third information.

Case B2: The command decoder of the storage medium determines, based on the plurality of storage units of the storage medium, the start address of the data to be processed.

For example, the command decoder of the storage medium randomly selects a storage unit from the plurality of storage units of the storage medium, and uses a first address bit of the randomly selected storage unit as the start address of the data to be processed. Further, in some implementations, the command decoder of the storage medium obtains, from the plurality of storage units of the storage medium in the processing manner indicated by the first information of the first processing command, a storage unit corresponding to the processing manner indicated by the first information, and randomly determines the storage unit from the storage unit corresponding to the processing manner indicated by the first information. Therefore, the first address bit of the randomly determined storage unit is used as the start address of the data to be processed. For example, the processing manner indicated by the first information is writing. Because writing refers to storing data in a storage unit in which no data is stored, the storage unit corresponding to the processing manner indicated by the first information is a storage unit in which no data is stored. In this case, the command decoder of the storage medium randomly determines the storage unit from the storage unit in which no data is stored, and uses the first address bit of the randomly determined storage unit as the start address of the data to be processed.

3032. The command decoder of the storage medium determines the at least two target storage units from the plurality of storage units of the storage medium based on the second information, lengths of the plurality of storage units, a length of at least one storage row, and the start address of the data to be processed.

For example, in this embodiment, a first target storage unit is determined based on the start address of the data to be processed, and a total quantity of target storage units is determined based on the data length indicated by the second information, the lengths of the storage units, and the start address of the data to be processed. For ease of description, the total quantity of target storage units is denoted as a first quantity, and in this embodiment, the first quantity of storage units including the first target storage unit are used as the at least two target storage units.

In an example embodiment, in response to determining the start address of the data to be processed in the foregoing case B1, that the first quantity of storage units including the first target storage unit are used as the at least two target storage units includes: The first target storage unit is used as a start point, and the first quantity of consecutive storage units are used as the at least two target storage units. In this case, addresses of the at least two target storage units are consecutive. For example, refer to FIG. 4. If the first target storage unit is the storage unit 0 in the row 0, and the total quantity of target storage units is 4, the target storage units are: the storage unit 0, the storage unit 1, a storage unit 2, and the storage unit 3 in the row 0.

It can be understood that the plurality of storage units of the storage medium are located in the at least one storage row, and a quantity of storage units included in one storage row is limited. Therefore, the at least two target storage units may cover the at least one storage row. In this embodiment, a storage row covered by the at least two target storage units needs to be determined with reference to a length of the storage row. The length of the storage row is equal to a sum of lengths of all storage units included in the storage row. For example, if one storage row includes 16 storage units of a length of 16 B, a length of the storage row is 256 B.

For example, a first storage row can be determined based on the start address of the data to be processed, a total quantity of storage rows can be determined based on the data length indicated by the second information, the length of the storage row, and the start address of the data to be processed, and the total quantity of storage rows is denoted as a second quantity. Therefore, covered storage rows are the second quantity of consecutive storage rows including the first storage row. For example, refer to FIG. 4. When the data length indicated by the second information is 512 B, the length of the storage row is 256 B, and the start address of the data to be processed is a first address bit of a storage unit 8 in the row 0, the first storage row is the row 0, and a total quantity of covered storage rows is 3, so that it can be determined that the covered storage rows are the row 0, a row 1, and a row 2 in the storage medium.

Alternatively, in response to determining the start address of the data to be processed in the foregoing case B2, that the first quantity of storage units including the first target storage unit are used as the at least two target storage units includes: A storage unit is randomly determined after the first target storage unit is determined, and the first target storage unit and the randomly determined storage unit are used as the at least two target storage units. In this case, addresses of the at least two target storage units are consecutive or inconsecutive. For a case in which the addresses of the at least two target storage units are consecutive, refer to the foregoing example. An example is not repeated herein again. For a case in which the addresses of the at least two target storage units are inconsecutive, refer to FIG. 4. An example in which the first target storage unit is the storage unit 0 in the row 0 and the total quantity of target storage units is 4 is still used. In this case, the target storage units may be: the storage unit 0, a storage unit 2, the storage unit 3, and a storage unit 4 in the row 0, where addresses of the storage unit 0 and the storage unit 2 are inconsecutive. In this case, the at least two target storage units also cover the at least one storage row, and the covered storage row may be determined based on an address of the randomly determined target storage unit.

It should be noted that, in the case B2, the target storage unit is randomly determined by the command decoder of the storage medium. Therefore, the command decoder of the storage medium needs to return the address of the target storage unit to the controller, so that the controller learns of target storage units based on which the command decoder of the storage medium performs data processing. Therefore, in an example embodiment, after the command decoder of the storage medium determines the at least two target storage units, the method further includes: The command decoder of the storage medium encapsulates a command identifier of the first processing command and the addresses of the at least two target storage units to obtain a response message, and sends the response message to the controller. The controller may determine the addresses of the at least two target storage units by receiving the response message. The command identifier of the first processing command in the response message is used by the controller to distinguish between different first processing commands. When the controller sends a plurality of first processing commands to the command decoder of the storage medium, the controller can determine, based on the command identifier of the first processing command carried in the response message, a first processing command based on which the command decoder of the storage medium determines the target storage unit.

In the foregoing descriptions, the command decoder of the storage medium parses the first processing command to obtain the first information and the second information (where the third information may be further included), and the command decoder of the storage medium determines the at least two target storage units based on the second information, where the at least two storage units cover the at least one storage row. The command decoder of the storage medium may send the covered storage row to a row address decoder, and send the target storage unit in each storage row to a column address decoder, so that the row address decoder and the column address decoder perform enabling. For example, in this embodiment, the command decoder of the storage medium may further only parse the first processing command, and separately send the obtained second information (where the third information may further be included) to the row address decoder and the column address decoder. Therefore, the row address decoder determines the covered storage row based on the received information in the manner in the foregoing descriptions, and the column address decoder determines the target storage unit in each storage row based on the received information in the manner in the foregoing descriptions, so that the row address decoder and the column address decoder perform enabling. For enabling processes of the row address decoder and the column address decoder, refer to descriptions in 304 below.

304. The command decoder of the storage medium performs, based on the at least two target storage units, data processing in the processing manner indicated by the first information.

It can be learned that the command decoder can implement data processing based on the at least two target storage units based on one first processing command sent by the controller. This data processing manner is also referred to as burst processing.

In an example embodiment, the first processing command further includes fourth information, the fourth information indicates a data grouping requirement, and the data grouping requirement includes grouping the at least two target storage units in a unit of a storage row, or grouping the at least two target storage units in a unit of a storage column. Correspondingly, the command decoder of the storage medium groups the at least two target storage units based on the data grouping requirement indicated by the fourth information, to obtain at least one group, and performs, based on a target storage unit in each group, data processing in the processing manner indicated by the first information. For example, the fourth information may be obtained by the controller from the first processing command. Before sending the first processing command to the command decoder of the storage medium, the controller encapsulates the fourth information into the first processing command.

For example, the fourth information is represented as a numeric value, and different values of the fourth information indicate different data grouping requirements. For example, if a value of the fourth information is a first value, it indicates that the data grouping requirement is to group the at least two target storage units in the unit of the storage row. If a value of the fourth information is a second value, it indicates that the data grouping requirement is to group the at least two target storage units in the unit of the storage column. The first value and the second value are different values.

In response to the data grouping requirement including grouping the at least two target storage units in the unit of the storage row, the command decoder performs data processing in the unit of the storage row. To be specific, for storage rows including target storage units, the command decoder first performs data processing based on each target storage unit in one of the storage rows, then switches to another storage row and performs data processing based on each target storage unit in the another storage row, and so on. The data processing process is ended after each storage row including the target storage unit is traversed. For example, as shown in FIG. 4, the target storage units include the storage unit 0 to a storage unit 15 in the row 0 and a storage unit 0 to a storage unit 15 in the row 1. In this case, the command decoder first performs data processing based on the storage unit 0 to the storage unit 15 in the row 0, and then switches to the row 1 and performs data processing based on the storage unit 0 to the storage unit 15 in the row 1, to complete the data processing process.

Alternatively, in response to the data grouping requirement including grouping the at least two target storage units in the unit of the storage column, the command decoder performs data processing in the unit of the storage column. For storage columns including target storage units, the command decoder first performs data processing based on each target storage unit in one of the storage columns, then switches to another storage column and performs data processing based on each target storage unit in the another storage column, and so on. The data processing process is ended after each storage column including the target storage unit is traversed. An example in which the target storage units include the storage unit 0 to a storage unit 15 in the row 0 and a storage unit 0 to a storage unit 15 in the row 1 is still used. In this case, the command decoder first performs data processing based on the storage units 0 in the row 0 and the row 1, and then switches to the storage unit 1 and performs data processing based on the storage units 1 in the row 0 and the row 1. By analogy, data processing is performed based on the storage units 15 in the row 0 and the row 1, to complete the data processing process.

It can be understood that a processing sequence of target storage units in groups is not limited in this embodiment of this application. For example, if the data grouping requirement includes grouping the at least two target storage units in the unit of the storage row, the command decoder separately performs data processing based on the storage units in the row 0 and the row 1. In this case, the command decoder first performs data processing based on the row 0, and then performs data processing based on the row 1; or the command decoder first performs data processing based on the row 1, and then performs data processing based on the row 0.

Further, for any storage unit, a process in which the command decoder performs data processing based on the storage unit includes: enabling the storage unit, and performing data processing based on the enabled storage unit. Therefore, when data processing is performed based on the target storage unit in each group, the command decoder also needs to enable the target storage unit in each group, to perform data processing based on the enabled target storage unit in the group.

For example, in this embodiment, target storage units in any group are enabled in parallel, to shorten time required for data processing and improve data processing efficiency. For example, that the command decoder of the storage medium performs, based on a target storage unit in each group, data processing in the processing manner indicated by the first information includes: For any group, the command decoder of the storage medium enables target storage units in the group in parallel, and performs, in the processing manner indicated by the first information, data processing on the target storage units enabled in parallel in the group, to cause a difference between processing time of the target storage units enabled in parallel in the group to be less than a threshold.

In response to grouping in the unit of the storage row, the command decoder sends a first command to the row address decoder in one parallel enabling process, and the row address decoder controls, based on the first command, the MUX corresponding to the row address decoder, so that the MUX corresponding to the row address decoder enables one storage row including a target storage unit. Correspondingly, the command decoder sends a second command corresponding to the first command to the column address decoder, and the column address decoder controls, based on the second command, the MUX corresponding to the column address decoder, so that the MUX corresponding to the column address decoder enables one or more storage columns corresponding to the storage row in parallel, to enable target storage units included in the storage row in parallel. Then, data processing is performed, in the processing manner indicated by the first information, on the target storage units enabled in parallel in the storage row. Target storage units in a same storage row are enabled in parallel, to cause a difference between processing time of target storage units enabled in parallel to be less than the threshold. In other words, it may be considered that data processing processes of the target storage units in the same storage row are performed synchronously.

It should be noted that, target duration is set in the storage medium, and the target duration is time required for a process of enabling one storage unit and performing data processing on the storage unit. In other words, timing starts when the command decoder sends the commands to the row address decoder and the column address decoder, and after the target duration elapses, it is considered that enabling and data processing of one storage unit are completed. In this embodiment, because the data processing processes of the target storage units in the same storage row are performed synchronously, timing starts when the command decoder sends the command, and after the target duration elapses, it is considered that enabling and data processing processes of each target storage unit in the storage row are completed.

Therefore, the command decoder may send new commands to the row address decoder and the column address decoder to indicate to enable target storage units in other storage rows in parallel and perform data processing on the target storage units.

An example in which the target storage units include the storage units 0 to 15 in the row 0 and the storage units 0 to 15 in the row 1 is used. The foregoing target duration is denoted as T, and a moment at which the command decoder sends the command for the first time is denoted as 0. In this case, at the moment 0, the command decoder sends the first command to the row address decoder and sends the second command corresponding to the first command to the column address decoder, and the row address decoder controls, based on the first command, the MUX corresponding to the row address decoder to enable the row 0, and the column address decoder controls, based on the first command, the MUX corresponding to the column address decoder to enable columns 0 to 15, to enable the storage units 0 to 15 in the row 0. Data processing is performed after the enabling is completed. At a moment T, it is considered that a data processing process based on the storage units 0 to 15 in the row 0 is completed. Therefore, the command decoder sends a new first command to the row address decoder and sends a new second command to the column address decoder to enable the storage units 0 to 15 in the row 1, and performs data processing after the enabling is completed. At a moment 2T, it is considered that a data processing process based on the storage units 0 to 15 in the row 1 is completed, so that the data processing process is ended.

Alternatively, in response to grouping in the unit of the storage column, the command decoder sends a first command to the column address decoder in one parallel enabling process, and the column address decoder controls, based on the first command, the MUX corresponding to the column address decoder to enable one storage column including a target storage unit. Correspondingly, the command decoder sends a second command corresponding to the first command to the row address decoder, and the row address decoder controls, based on the second command, the MUX corresponding to the row address decoder, so that the MUX corresponding to the row address decoder enables one or more storage rows corresponding to the storage column, to enable target storage units included in the storage column in parallel. Then, data is processed, in the processing manner indicated by the first information, on the target storage units enabled in parallel in the storage column, to cause a difference between processing time of the target storage units enabled in parallel in the storage column to be less than the threshold.

Figure 5:
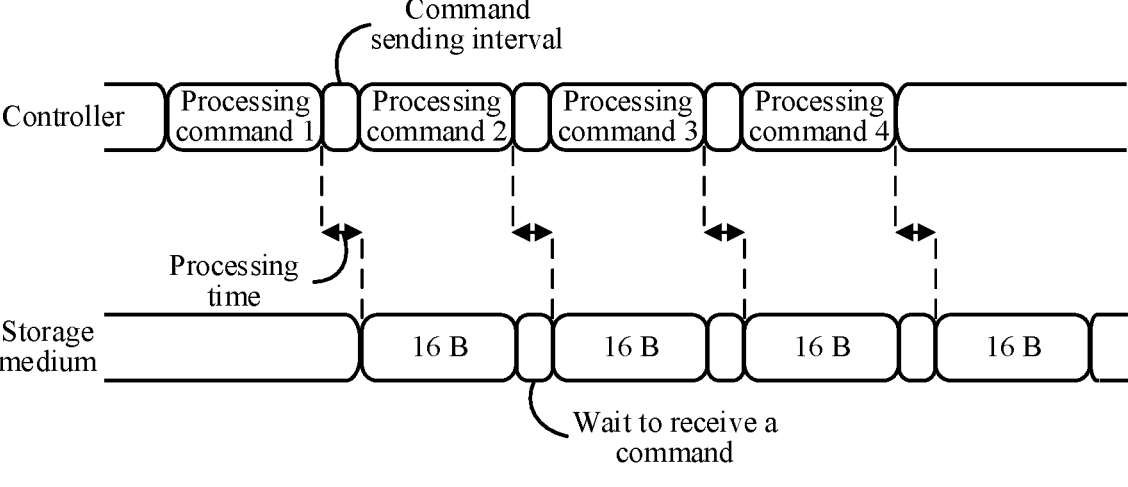
FIG. 5 is a schematic flowchart of data processing in a related technology according to an embodiment of this application.

In a case of parallel enabling, time required for performing data processing in this embodiment is less than time required for performing data processing in a related technology. FIG. 5 shows a process of performing data processing in the related technology. In the related technology, each time a storage medium receives a processing command sent by a controller, the storage medium enables a storage unit and performs data processing on the storage unit. After enabling and data processing of the storage unit are completed, the storage medium waits to receive a next processing command from the controller, and enables a next storage unit and performs data processing on the next storage unit based on the next processing command. An example in which a length of one storage unit is 16 B is used. If data of a length of 64 B is processed based on the related technology, the controller needs to send four processing commands. On this basis, time required by the storage medium to complete enabling and data processing of one storage unit is denoted as P, and time required by the storage medium to wait for a command is denoted as Q. It can be learned from FIG. 5, that total time required for processing the data of the length of 64 B based on the related technology is 4P+3Q.

Figure 6:
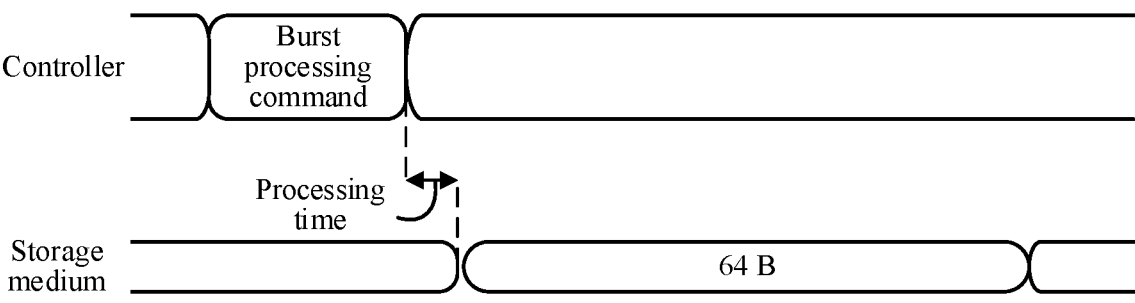
FIG. 6 is a schematic flowchart of data processing according to an embodiment of this application.

In this embodiment, as shown in FIG. 6, each time the storage medium receives one burst processing command sent by the controller, the storage medium may perform data processing on at least two target storage units, so that a quantity of processing commands that need to be sent by the controller is reduced, and the storage medium does not need to wait to receive another processing command. In addition, because processes of enabling the target storage units are parallel, data processing processes of the target storage units are performed synchronously. Within same duration, in the related technology, data processing on only one storage unit can be completed. However, in this embodiment, data processing on at least two target storage units can be completed, so that time required for data processing is shortened. As shown in FIG. 6, time required for completing enabling data processing of one storage unit and is still denoted as P. In this case, data of a length of 64 B is processed based on the method provided in this embodiment, the controller only needs to send one processing command, and total time required for processing the data of the length of 64 B is P. Compared with the related technology, time (3P+3Q) is reduced.

Certainly, the method provided in this embodiment is not limited to the case of parallel enabling. For example, for any group, in this embodiment, serial enabling may also be performed on target storage units in the group according to an actual requirement. A difference between the serial enabling and the parallel enabling lies in that, the parallel enabling is to synchronously enable target storage units in a same group, while the serial enabling is to sequentially enable target storage units in a same group. An example is used to describe a serial enabling process: When grouping is performed in the unit of the storage row and the target storage units include the storage units 0 to 2 in the row 0, time required for a process of enabling and data processing of one storage unit is denoted as T, and a moment at which the command decoder starts to send a command is denoted as 0. In this case, at the moment 0, the command decoder indicates the row address decoder to enable the row 0 and indicates the column address decoder to enable the column 0, so that the storage unit 0 in the row 0 is enabled. At a moment T, the command decoder indicates the row address decoder to enable the row 0 and indicates the column address decoder to enable the column 1, so that the storage unit 1 in the row 0 is enabled. At a moment 2T, the command decoder indicates the row address decoder to enable the row 0 and indicates the column address decoder to enable the column 2, so that the storage unit 2 in the row 0 is enabled. At a moment 3T, it is considered that a data processing process based on the storage units 0 to 2 in the row 0 is completed, and the data processing process is ended.

In addition, it can be learned from the foregoing descriptions that the first information can indicate a plurality of processing manners. When the processing manners indicated by the first information are different, processes in which the command decoder of the storage medium completes data processing in the processing manners indicated by the first information are also different. Refer to the following case C1 and case C2.

Case C1: The processing manner indicated by the first information includes a first processing manner, and the first processing manner includes a processing manner of storing data in a storage unit. For example, the first processing manner includes but is not limited to writing and overwriting. The command decoder of the storage medium further needs to obtain data, to store the data in the first processing manner. Therefore, the method provided in this embodiment further includes: The controller sends data. For example, the data sent by the controller is data received by the controller from the processor. Correspondingly, that the command decoder of the storage medium performs, based on the at least two target storage units, data processing in the processing manner indicated by the first information includes: storing, in the at least two target storage units in the first processing manner, the data sent by the controller. For example, after sending the first processing command to the command decoder of the storage medium, the controller continues to send data to the command decoder of the storage medium, so that the command decoder stores the data in the target storage units. Alternatively, after sending the first processing command to the command decoder of the storage medium, the controller sends data to a data processing unit in the storage medium, and the command decoder controls the data processing unit to store the data in the target storage units after determining that the target storage units are enabled.

Case C2: The processing manner indicated by the first information includes a second processing manner, and the second processing manner includes a manner of processing data based on a storage unit in which data is already stored. For example, the second processing manner includes but is not limited to reading and erasing. That the command decoder of the storage medium performs, based on the at least two target storage units, data processing in the processing manner indicated by the first information includes: The command decoder of the storage medium processes, in the second processing manner, data already stored in the at least two target storage units.

In an example embodiment, after that the command decoder of the storage medium processes, in the second processing manner, data already stored in the at least two target storage units, the method further includes: The command decoder of the storage medium sends, based on an address sequence of the at least two target storage units, the data already stored in the at least two target storage units to the controller. Correspondingly, the controller further receives the data that is already stored in the at least two target storage units and that is sent by the command decoder of the storage medium. For example, the command decoder of the storage medium sends data in a plurality of sending processes, and a length of data sent in each sending process is determined based on a bit width of an I/O interface, that is, the length of the data sent in each sending process is not greater than the bit width of the I/O interface. Therefore, the command decoder of the storage medium first divides, based on the bit width of the I/O interface, data already stored in the first target storage unit into a plurality of parts, and separately sends the parts to the controller based on an address sequence. After all parts in the first target storage unit are sent, data already stored in a second target storage unit is divided and sent in the same manner. The rest is performed by analogy, until all data already stored in each target storage unit is sent.

For example, if a quantity of target storage units is 2, a length is 16 B, and the bit width of the I/O interface is 1 B, data already stored in a first target storage unit is first divided into 16 parts of a length of 1 B. A first part, a second part, . . . , and a $16^{th}$ part in the first target storage unit are sent based on an address sequence, so that the data already stored in the first target storage unit is sent to the controller in 16 sending processes. Then, data already stored in a second target storage unit is also divided into 16 parts of a length of 1 B, and the data already stored in the second target storage unit is sent to the controller in 16 sending processes.

The foregoing describes the data processing method provided in embodiments of this application. The following uses an example in which a length of a storage unit is 16 B and the processing manner is reading. An application process of the data processing manner provided in embodiments of this application is described by using the following three examples.

Figure 7:
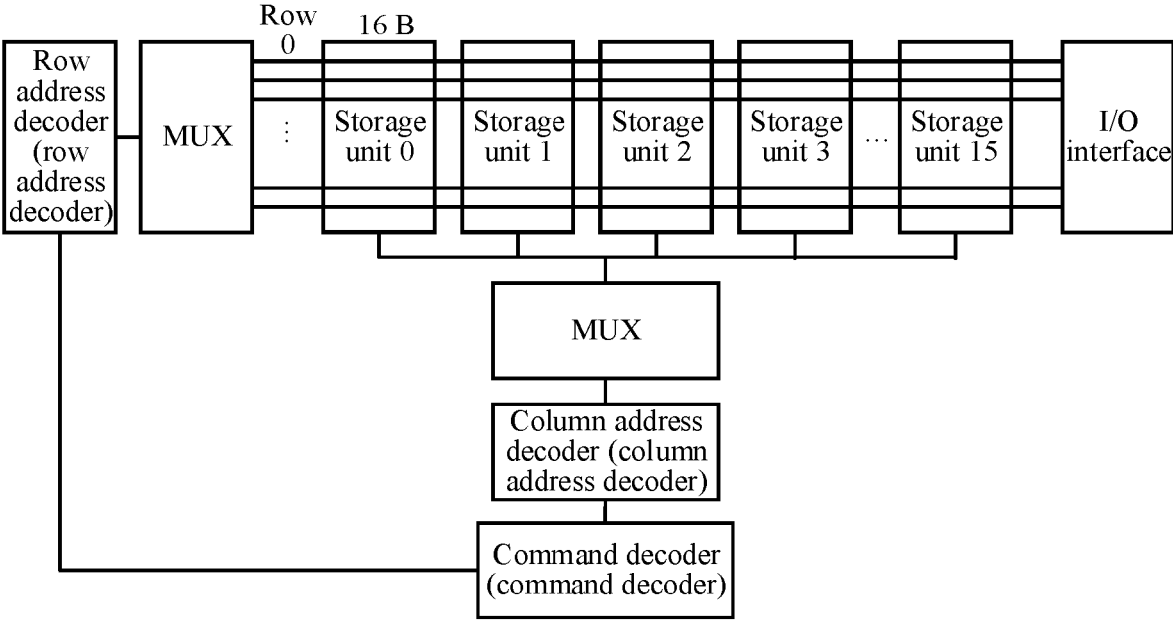
FIG. 7 is a schematic diagram of data processing according to an embodiment of this application.

Example 1: FIG. 7 shows a process of reading data of 64 B. The command decoder of the storage medium controls the row address decoder and the corresponding MUX to enable the row 0, and controls the column address decoder and the corresponding MUX to enable the columns 0 to 3, so that the storage units 0 to 3 in the row 0 are enabled. Then, data stored in the storage units 0 to 3 in the row 0 is read, and a total of 64 B of data is read.

Figure 8:
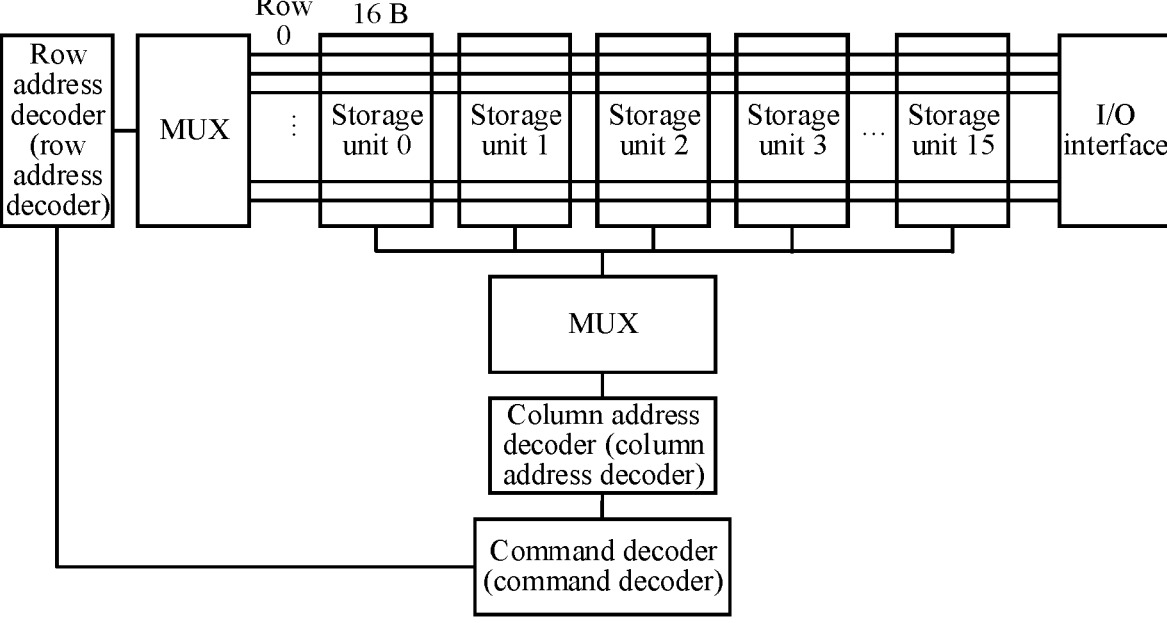
FIG. 8 is a schematic diagram of data processing according to an embodiment of this application.

Example 2: FIG. 8 shows a process of reading data of 256 B. The command decoder of the storage medium controls the row address decoder and the corresponding MUX to enable the row 0, and controls the column address decoder and the corresponding MUX to enable the columns 0 to 15, so that the storage units 0 to 15 in the row 0 are enabled. Then, data stored in the storage units 0 to 15 in the row 0 is read, and a total of 256 B of data is read.

Figure 9:
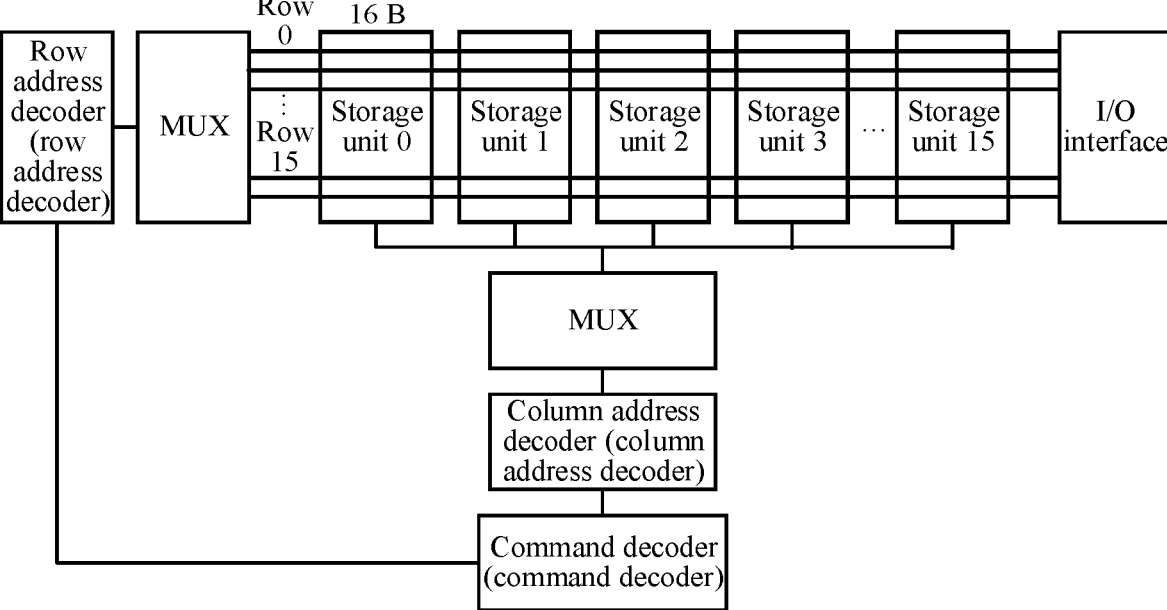
FIG. 9 is a schematic diagram of data processing according to an embodiment of this application.

Example 3: FIG. 9 shows a process of reading data of 4 KB (that is, 4096 B). The command decoder of the storage medium controls the row address decoder and the corresponding MUX to enable the row 0, and controls the column address decoder and the corresponding MUX to enable the columns 0 to 15, so that the storage units 0 to 15 in the row 0 are enabled, and data of 256 B is read. Then, the command decoder of the storage medium controls the row address decoder and the corresponding MUX to enable the row 1, controls the column address decoder and the corresponding MUX to enable the columns 0 to 15, so that the storage units 0 to 15 in the row 1 are enabled, and data of 256 B continues to be read. The rest is performed by analogy, until the command decoder of the storage medium controls the row address decoder and the corresponding MUX to enable a row 15, and controls the column address decoder and the corresponding MUX to enable the columns 0 to 15, so that storage units 0 to 15 in the row 15 are enabled, and data of 256 B is read. Therefore, a total of 4 KB of data in 16 rows is read.

In conclusion, the controller only needs to send one processing command, so that the command decoder of the storage medium can perform continuous data processing based on at least two storage units. Compared with a case in which each processing command can only indicate the command decoder to perform data processing based on one storage unit, the data processing manner provided in this embodiment can reduce a quantity of processing commands that need to be sent by the controller. Therefore, processing resources that need to be consumed by the controller in a data processing process are reduced, a resource waste is avoided, and data processing efficiency is improved.

It should be understood that the foregoing processor may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machines (advanced RISC machines, ARM) architecture.

Further, in an optional embodiment, the foregoing storage medium may include a read-only storage medium and a random access storage medium, and provide instructions and data for the processor. The storage medium may further include a non-volatile random access storage medium. For example, the storage medium may further store information about a device type.

The storage medium may be a volatile storage medium or a non-volatile storage medium, or may include both a volatile storage medium and a non-volatile storage medium. The non-volatile storage medium may be a phase change memory (PCM), a read-only storage medium (ROM), a programmable read-only storage medium (PROM), an erasable programmable read-only storage medium (EPROM), an electrically erasable programmable read-only storage medium (EEPROM), or a flash memory. The volatile storage medium may be a random access storage medium (RAM) used as an external cache. By way of example but not limitation, many forms of RAMs are available, for example, a static random access storage medium (static RAM, SRAM), a dynamic random access storage medium (DRAM), a synchronous dynamic random access storage medium (synchronous DRAM, SDRAM), a double data rate synchronous dynamic random access storage medium (double data rate SDRAM, DDR SDRAM), an enhanced synchronous dynamic random access storage medium (enhanced SDRAM, ESDRAM), a synchlink dynamic random access storage medium (synchlink DRAM, SLDRAM), and a direct rambus random access storage medium (direct rambus RAM, DR RAM).

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or any other programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A storage apparatus, comprising:
a storage medium comprising a command decoder and a plurality of storage units, and
a controller connected to the command decoder of the storage medium, the controller being configured to send a first processing command to the command decoder of the storage medium, the first processing command comprising first information, second information, and a data grouping requirement, wherein the first information indicates a processing manner and the second information indicates a data length of data to be processed; and
wherein the command decoder of the storage medium is configured to:
receive the first processing command sent by the controller;
determine at least two target storage units from the plurality of storage units of the storage medium based on the data length indicated by the second information;
group the at least two target storage units based on the data grouping requirement to obtain at least one group,
enable, in parallel, the at least two target storage units in the at least one group, and
perform, based on at least one target storage unit in the at least one group, data processing, in the processing manner indicated by the first information, on the target storage units enabled in parallel, wherein the data processing on the target storage units enabled in parallel is performed synchronously.

2. The storage apparatus according to claim 1, wherein the plurality of storage units of the storage medium are located in at least one storage row, and the command decoder of the storage medium is configured to determine a start address of the data to be processed, and determine the at least two target storage units from the plurality of storage units of the storage medium based on the second information, lengths of the plurality of storage units, and a length of the at least one storage row.

3. The storage apparatus according to claim 2, wherein the first processing command further comprises third information, and the third information indicates an address; and the command decoder of the storage medium is configured to determine the address indicated by the third information as the start address of the data to be processed, wherein addresses of the at least two target storage units are consecutive.

4. The storage apparatus according to claim 2, wherein the command decoder of the storage medium is configured to determine, based on the plurality of storage units of the storage medium, the start address of the data to be processed, wherein addresses of the at least two target storage units are consecutive or inconsecutive;
the command decoder of the storage medium is further configured to encapsulate a command identifier of the first processing command and the addresses of the at least two target storage units to obtain a response message, and send the response message to the controller; and
the controller is further configured to receive the response message.

5. The storage apparatus according to claim 1, wherein the processing manner indicated by the first information comprises a first processing manner, and the first processing manner comprises a processing manner of storing data in a storage unit, wherein the controller is further configured to send data, and wherein the command decoder of the storage medium is configured to store, in the at least two target storage units in the first processing manner, the data sent by the controller.

6. The storage apparatus according to claim 1, wherein the processing manner indicated by the first information comprises a second processing manner, and the second processing manner comprises a manner of performing data processing based on a storage unit in which data is already stored, and wherein the command decoder of the storage medium is configured to process, in the second processing manner, the data already stored in the at least two target storage units.

7. The storage apparatus according to claim 6, wherein the command decoder of the storage medium is further configured to send, based on an address sequence of the at least two target storage units, the data already stored in the at least two target storage units to the controller; and the controller is further configured to receive the data that is already stored in the at least two target storage units and that is sent by the command decoder of the storage medium.

8. The storage apparatus according to claim 1, wherein the data grouping requirement comprises grouping the at least two target storage units in a unit of a storage row, or grouping the at least two target storage units in a unit of a storage column.

9. The storage apparatus according to claim 1, wherein the at least two target storage units are located in a same logical unit number, and the target storage unit is a minimum unit for data processing.

10. The storage apparatus according to claim 1, wherein the command decoder of the storage medium is further configured to parse the first processing command to obtain the first information and the second information.

11. The storage apparatus according to claim 1, wherein a sum of lengths of the at least two target storage units is not less than the data length indicated by the second information.

12. The storage apparatus according to claim 1, wherein there are a plurality of storage media, and the controller is configured to receive a storage medium identifier, and send the first processing command to a command decoder of a storage medium indicated by the storage medium identifier.

13. A data processing method, wherein the method is applied to a storage apparatus comprising a controller and a storage medium, the storage medium comprising a command decoder and a plurality of storage units, the method comprising:

receiving, by the command decoder, a first processing command sent by the controller, wherein the first processing command comprises first information, second information, and a data grouping requirement, wherein the first information indicates a processing manner and the second information indicates a data length of data to be processed;

performing, by the command decoder of the storage medium:

determining at least two target storage units from the plurality of storage units of the storage medium based on the data length indicated by the second information;

grouping the at least two target storage units based on the data grouping requirement to obtain at least one group, enabling, in parallel, the at least two target storage units in the at least one group, and performing, based on at least one target storage unit in the at least one group, data processing, in the processing manner indicated by the first information, on the target storage units enabled in parallel, wherein the data processing on the target storage units enabled in parallel is performed synchronously.

14. The method according to claim 13, wherein the plurality of storage units of the storage medium are located in at least one storage row, and the determining, by the command decoder of the storage medium, the at least two target storage units from the plurality of storage units of the storage medium based on the data length indicated by the second information comprises:

determining, by the command decoder of the storage medium, a start address of the data to be processed; and determining, by the command decoder of the storage medium, the at least two target storage units from the plurality of storage units of the storage medium based on the second information, lengths of the plurality of storage units, and a length of the at least one storage row.

15. The method according to claim 14, wherein the first processing command further comprises third information, and the third information indicates an address; and the determining, by the command decoder of the storage medium, the start address of the data to be processed comprises:

determining, by the command decoder of the storage medium, the address indicated by the third information as the start address of the data to be processed, wherein addresses of the at least two target storage units are consecutive.

16. The method according to claim 13, wherein the data grouping requirement comprises grouping the at least two target storage units in a unit of a storage row, or grouping the at least two target storage units in a unit of a storage column.

17. A data processing method applied to a storage apparatus comprising a controller and a storage medium, the storage medium comprising a command decoder and a plurality of storage units, the method comprising:

determining, by the controller, first information, second information and a data grouping requirement, wherein the first information indicates a processing manner, wherein the second information indicates a data length of data to be processed, wherein the data length is used to determine at least two target storage units from the plurality of storage units of the storage medium, wherein the at least two target storage units are used for data processing, wherein the data grouping requirement enables the command decoder to group the at least two target storage units to obtain at least one group and enable, in parallel, the at least two target storage units in the at least one group;

encapsulating, by the controller, the first information, the second information, and the data grouping requirement to obtain a first processing command; and sending, by the controller, the first processing command to the command decoder of the storage medium,

wherein the command decoder is configured to synchro-
nously perform the data processing on the target stor-
age units enabled in parallel.

18. The data processing method according to claim 17,
wherein the first processing command further comprises third
information, and the third information indicates an
address, and wherein the third information is for the
command decoder of the storage medium to determine
a start address of the data to be processed.

19. The data processing method according to claim 17,
further comprising performing, by the command decoder:

receiving the first processing command sent by the con-
troller, determining at least two target storage units from the
plurality of storage units of the storage medium based
on the data length indicated by the second information, grouping the at least two target storage units based on the
data grouping requirement to obtain at least one group,
and enabling, in parallel, the at least two target storage units
in the at least one group, and wherein the command decoder is configured to synchro-
nously perform the data processing on the target stor-
age units enabled in parallel to cause a difference
between processing time of the target storage units
enabled in parallel to be less than a threshold.

\* \* \* \* \*

28